United States Patent
Maekawa (10) Patent No.: US 9,025,181 B2
(45) Date of Patent: May 5, 2015

(54) PRINTER AND PROXY SERVER

(75) Inventor: Yohei Maekawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 200 days.

(21) Appl. No.: 13/619,446

(22) Filed: Sep. 14, 2012

(65) Prior Publication Data

US 2013/0163016 A1      Jun. 27, 2013

(30) Foreign Application Priority Data

Dec. 22, 2011   (JP) .................................. 2011-281085

(51) Int. Cl.
   *G06F 3/12*   (2006.01)
   *G06K 15/00*   (2006.01)

(52) U.S. Cl.
   CPC ............ *G06F 3/1221* (2013.01); *G06K 15/402* (2013.01); *G06K 15/4055* (2013.01); *G06F 3/1229* (2013.01); *G06F 3/1236* (2013.01); *G06F 3/1267* (2013.01); *G06F 3/1288* (2013.01); *Y02B 60/1271* (2013.01)

(58) Field of Classification Search
   USPC ........................................................ 358/1.15
   See application file for complete search history.

(56) References Cited

U.S. PATENT DOCUMENTS

| | | | | |
|---|---|---|---|---|
| 2002/0134268 A1* | 9/2002 | Yamada | ........................ | 101/484 |
| 2003/0056133 A1* | 3/2003 | Talley | ........................... | 713/323 |
| 2005/0128515 A1* | 6/2005 | Ohno | .......................... | 358/1.15 |
| 2006/0265473 A1* | 11/2006 | Muto | ........................... | 709/218 |
| 2009/0086261 A1* | 4/2009 | Irino | ........................... | 358/1.15 |
| 2011/0299120 A1* | 12/2011 | Sekine et al. | ................ | 358/1.15 |

FOREIGN PATENT DOCUMENTS

| | | | |
|---|---|---|---|
| JP | 2000-305883 A | 11/2000 | |
| JP | 2006-235814 A | 9/2006 | |
| JP | 2007-318401 A | 12/2007 | |

\* cited by examiner

*Primary Examiner* — Huo Long Chen
(74) *Attorney, Agent, or Firm* — Merchant & Gould PC (57) ABSTRACT

A printer includes: a printer-side establishment unit; an instruction transmitting unit for transmitting a connection instruction when the printer is to be changed from a first state to a second state; a printer-side notification receiving unit for receiving: a print notification from a notification server when the printer is at the first state; and a changing notification from a proxy server when the printer is at the second state; a change unit for changing the state of the printer as: from the first state to the second state when the connection instruction is transmitted to the proxy server; and from the second state to the first state when the changing notification is received from the proxy server; and a print control unit for controlling a print performing unit to perform printing in accordance with print data when the changing notification is received from the proxy server.

12 Claims, 5 Drawing Sheets

PRINTER AND PROXY SERVER

CROSS-REFERENCE TO RELATED APPLICATIONS

This application claims priority from Japanese Patent Application No. 2011-281085 filed on Dec. 22, 2011, the entire subject matter of which is incorporated herein by reference.

TECHNICAL FIELD

The invention relates to a printer configured to be switched between a first state and a second state where power is less consumed than in the first state. The invention also relates to a proxy server configured to communicate with a printer.

BACKGROUND

There have been proposed a system including a server, a plurality of printers and a PC. The server is always in communication with the plurality of printers and is configured to collect information about operating states and situations of the respective printers. A user instructs a print output by using the PC. In this case, the server transmits the information about operating states and situations of the respective printers to the PC. The PC displays the information about operating states and situations of the respective printers on a monitor of the PC. The user selects a printer to perform the print output based on the display content on the monitor. In this case, the server transmits print data to the selected printer.

SUMMARY

There have been known a printer configured to be switched between a first state and a second state where power is less consumed than in the first state.

Illustrative aspects of the present invention provide a technology for enabling a printer, which performs printing by using a server, to appropriately perform printing while appropriately reducing power consumption of the printer.

According to one illustrative aspect of the invention, there is provided a printer configured to be switched between a first state and a second state where power is less consumed than in the first state. The printer comprises: a processor; and a memory having computer-readable instructions stored thereon that, when executed by the processor, cause the printer to operate as: a printer-side establishment unit; an instruction transmitting unit; a printer-side notification receiving unit; a change unit; and a print control unit. The printer-side establishment unit is configured to establish a connection between the printer and a notification server when the printer is at the first state, wherein the printer-side establishment unit is unable to establish the connection between the printer and the notification server when the printer is at the second state. The instruction transmitting unit is configured to transmit a connection instruction for establishing a connection between a proxy server and the notification server to the proxy server when a state of the printer is to be changed from the first state to the second state. The printer-side notification receiving unit is configured to receive: a print notification from the notification server in a first situation where the printer is at the first state and the connection between the printer and the notification server is kept; and a changing notification from the proxy server in a second situation where the printer is at the second state and the connection between the proxy server and the notification server is kept. The print notification is transmitted from the notification server to the printer when a print instruction is supplied from a terminal device to the notification server during the first situation. The changing notification is transmitted from the proxy server to the printer, when the print instruction is supplied from the terminal device to the notification server during the second situation and the print instruction is transmitted from the notification server to the proxy server. The change unit is configured to change the state of the printer from the first state to the second state when the connection instruction is transmitted to the proxy server, and configured to change the state of the printer from the second state to the first state when the changing notification is received from the proxy server. The print control unit is configured to control a print performing unit to perform printing in accordance with print data when the print notification is received from the notification server, and configured to control the print performing unit to perform printing in accordance with print data when the changing notification is received from the proxy server.

DETAILED DESCRIPTION

<General Overview>

According to a first illustrative aspect of the invention, there is provided a printer configured to be switched between a first state and a second state where power is less consumed than in the first state. The printer comprises: a processor; and a memory having computer-readable instructions stored thereon that, when executed by the processor, cause the printer to operate as: a printer-side establishment unit; an instruction transmitting unit; a printer-side notification receiving unit; a change unit; and a print control unit. The printer-side establishment unit is configured to establish a connection between the printer and a notification server when the printer is at the first state, wherein the printer-side establishment unit is unable to establish the connection between the printer and the notification server when the printer is at the second state. The instruction transmitting unit is configured to transmit a connection instruction for establishing a connection between a proxy server and the notification server to the proxy server when a state of the printer is to be changed from the first state to the second state. The printer-side notification receiving unit is configured to receive: a print notification from the notification server in a first situation where the printer is at the first state and the connection between the printer and the notification server is kept; and a changing notification from the proxy server in a second situation where the printer is at the second state and the connection between the proxy server and the notification server is kept. The print notification is transmitted from the notification server to the printer when a print instruction is supplied from a terminal device to the notification server during the first situation. The changing notification is transmitted from the proxy server to the printer, when the print instruction is supplied from the terminal device to the notification server during the second situation and the print instruction is transmitted from the notification server to the proxy server. The change unit is configured to change the state of the printer from the first state to the second state when the connection instruction is transmitted to the proxy server, and configured to change the state of the printer from the second state to the first state when the changing notification is received from the proxy server. The print control unit is configured to control a print performing unit to perform printing in accordance with print data when the print notification is received from the notification server, and configured to control the print performing unit to perform printing in accordance with print data when the changing notification is received from the proxy server.

According to the above configuration, the printer establishes the connection between the printer and the notification server when the printer is at the first state. Therefore, when the print instruction is supplied from the terminal device to the notification server while the printer is at the first state, the printer can appropriately receive the print notification from the notification server. As a result, the printer can appropriately perform printing. On the other hand, when the printer is at the second state, the printer is unable to establish the connection between the printer and the notification server. Therefore, when the state of the printer is to be changed from the first state to the second state, the printer transmits the connection instruction to the proxy server to establish the connection between the proxy server and the notification server. Thereby, the printer can be changed from the first state to the second state, so that it is possible to appropriately reduce the power consumption of the printer. In addition, when the print instruction is supplied from the terminal device to the notification server while the printer is at the second state, the printer receives the changing notification from the proxy server and changes from the second state to the first state. As a result, the printer can appropriately perform printing. According to the above configuration, it is possible to enable the printer, which performs printing by using the notification server, to perform printing while appropriately reducing the power consumption.

According to a second illustrative aspect of the invention, the computer-readable instructions that, when executed by the processor, cause the printer to operate as: a storage control unit configured to store authentication information for establishing the connection with the notification server in a storage unit of the printer. The printer-side establishment unit is configured to transmit the stored authentication information in the storage unit to the notification server and establish the connection between the printer and the notification server, when the printer is at the first state. The instruction transmitting unit is configured to transmit the connection instruction including the authentication information in the storage unit to the proxy server.

According to the above configuration, when the printer is at the first state, the printer transmits the authentication information to the notification server and establishes the connection between the printer and the notification server. Further, when the state of the printer is to be changed from the first state to the second state, the printer transmits the connection instruction including the authentication information to the proxy server, thereby appropriately establishing the connection between the proxy server and the notification server.

According to a third illustrative aspect of the invention, the instruction transmitting unit is configured to transmit to the proxy server the connection instruction including first condition information representing a first condition pre-designated by a user. The first condition is for determining timing at which the proxy server transmits the changing notification to the printer.

According to the above configuration, the printer can receive the changing notification from the proxy server at timing adapted to the first condition pre-designated by the user of the printer.

According to a fourth illustrative aspect of the invention, when the printer is at the second state and an operation unit of the printer receives a user instruction, the change unit is configured to change the state of the printer from the second state to the first state even when the changing notification is not received from the proxy server, the printer-side establishment unit is configured to establish the connection between the printer and the notification server after the state of the printer is changed from the second state to the first state, and the instruction transmitting unit is configured to transmit a predetermined instruction to the proxy server after the state of the printer is changed from the second state to the first state.

According to the above configuration, the printer can perform appropriate processing in accordance with the predetermined operation.

According to a fifth illustrative aspect of the invention, when the changing notification is received from the proxy server, the printer-side establishment unit is configured to establish the connection between the printer and the notification server after the state of the printer is changed from the second state to the first state, and the print control unit is configured to obtain the print data from the notification server after the connection between the printer and the notification server is established, and then configured to control the print performing unit to perform printing in accordance with the print data.

According to the above configuration, the printer can appropriately obtain the print data from the notification server and appropriately perform printing in accordance with the print data.

According to a sixth illustrative aspect of the invention, there is provided a proxy server comprising: a processor; and a memory having computer-readable instructions stored thereon that, when executed by the processor, cause the proxy server to operate as: an instruction receiving unit; a server-side establishment unit; a server-side notification receiving unit; and a notification transmitting unit. The instruction receiving unit is configured to receive a connection instruction for establishing a connection between the proxy server and a notification server from a printer when a state of the printer is to be changed from a first state to a second state where power is less consumed than in the first state. The server-side establishment unit is configured to establish the connection between the proxy server and the notification server when the connection instruction is received from the printer. The server-side notification receiving unit is configured to receive a print notification from the notification server in a second situation where the printer is at the second state and the connection between the proxy server and the notification server is kept, wherein the print notification is transmitted from the notification server to the proxy server when a print instruction is supplied from a terminal device to the notification server during the second situation. The notification transmitting unit is configured to transmit to the printer a changing notification for changing the state of the printer from the second state to the first state when the print notification is received from the notification server.

According to the above configuration, when the state of the printer is to be changed from the first state to the second state, the proxy server receives the connection instruction from the printer to establish the connection between the proxy server and the notification server. Therefore, while the printer is at the second state, the proxy server can receive the print notification from the notification server, acting in place of the printer. Also, in this case, the proxy server transmits the changing notification to the printer to change the state of the printer from the second state to the first state. Hence, it is possible to enable the printer to appropriately perform printing.

According to a seventh illustrative aspect of the invention, the instruction receiving unit is configured to receive from the printer the connection instruction including first condition information representing a first condition pre-designated by a user of the printer. The notification transmitting unit is configured to determine timing at which the proxy server transmits the changing notification to the printer in accordance with the first condition when the print notification is received from the notification server, and configured to transmit the changing notification to the printer at the determined timing.

According to the above configuration, the proxy server can transmit the changing notification to the printer at timing adapted to the first condition pre-designated by the user of the printer.

According to an eighth illustrative aspect of the invention, the server-side notification receiving unit is configured to further receive from the notification server second condition information representing a second condition pre-designated by a user of the terminal device. The notification transmitting unit is configured to determine the timing in accordance with the first condition and the second condition when the print notification is received from the notification server.

According to the above configuration, the proxy server can transmit the changing notification to the printer at timing adapted to the first condition pre-designated by the user of the printer and the second condition pre-designated by the user of the terminal device.

According to a ninth illustrative aspect of the invention, the computer-readable instructions that, when executed by the processor, cause the proxy server to operate as: an obtaining unit configured to obtain print data from the notification server when the print notification is received from the notification server; and a supply unit configured to supply the print data to the printer.

According to the above configuration, the proxy server supplies the print data to the printer, so as to enable the printer to appropriately perform printing.

Incidentally, a control method, a computer program and non-transitory computer-readable storage medium storing the computer program for implementing the printer are also novel and useful. Also, a control method, a computer program and a non-transitory computer-readable storage medium storing the computer program for implementing the proxy server are also novel and useful. Also, a system including the printer and the proxy server is also novel and useful.

EXEMPLARY EMBODIMENTS

Exemplary embodiments of the present invention will now be described with reference to the drawings.

(Configuration of System)

Figure 1:
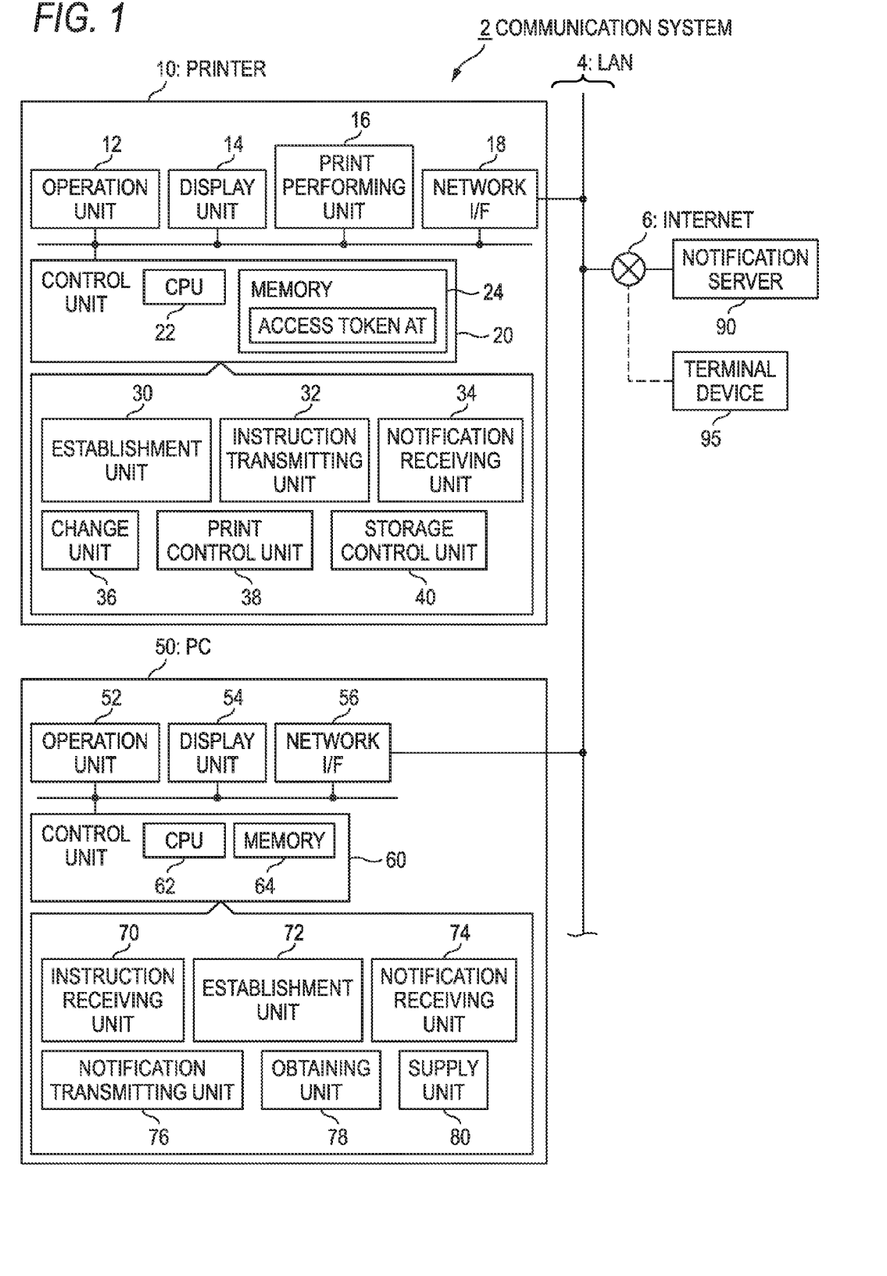
FIG. 1 shows an example of a configuration of a communication system.

As shown in FIG. 1, a communication system 2 includes a printer 10, a PC 50, a notification server 90 and a terminal device 95. The printer 10 and the PC 50 are connected to a LAN 4. Accordingly, the printer 10 is connected in communication with the PC through the LAN 4. The printer 10 and the PC 50 are connected to an internet 6 through the LAN 4. The notification server 90 is connected to the internet 6. Therefore, the printer 10 and the PC 50 are connected in communication with the notification server 90 through the LAN 4 and the internet 6. The terminal device 95 is a well-known communication terminal device such as desktop PC, laptop PC, tablet PC, mobile phone, smartphone, PDA terminal and the like, for example. When a user of the terminal device 95 performs an operation for connecting the terminal device 95 to the internet 6, the terminal device 95 is connected in communication with the internet 6. In this case, the terminal device 95 is connected in communication with the notification server 90 through the internet 6.

(Configuration of Printer 10)

The printer 10 includes an operation unit 12, a display unit 14, a print performing unit 16, a network interface 18 and a control unit 20. The respective units 12 to 20 are connected to a bus line (a reference numeral thereof is omitted). The operation unit 12 includes a plurality of keys. A user can input a variety of instructions to the printer 10 by operating the operation unit 12. The display unit 14 is configured to display a variety of information. The print performing unit 16 has a print mechanism such as inkjet type and laser type and performs printing in response to an instruction from the control unit 20. The network interface 18 is connected to the LAN 4.

The control unit 20 includes a CPU 22 and a memory 24. Although not shown, the CPU 22 includes a main CPU and a sub CPU. The main CPU is a processor executing main processing (for example, print processing, display processing and the like) that are performed by the printer 10. The main CPU and the sub CPU perform a variety of processing in response to programs (not shown) stored in the memory 24. As the main CPU and the sub CPU perform the processing in response to the programs, functions of respective units 30 to 40 are implemented. Incidentally, the sub CPU is a processor for starting a clock supply to the main CPU when a return condition of the main CPU (which will be described later) is satisfied at a state where the clock supply to the main CPU is stopped.

(States of Printer 10)

The printer 10 is configured to be switched among a processing state, a standby state, light sleep state (hereinafter, referred to as 'L sleep state') and a deep sleep state (hereinafter, referred to as 'D sleep state').

The processing state includes a state where the print performing unit 16 performs printing, in response to a print instruction (print notification PN (refer to FIG. 2), for example) that is provided from an external device (for example, the notification server 90 and the PC 50). Further, the processing state includes a state where the control unit 20 supplies image data to the display unit 14 in response to an operation made using the operation unit 12. At the processing state, the clocks are supplied to the main CPU, and the main CPU performs the print processing, the image data supply processing and the like. Further, at the processing state, a light source of the display unit 14 turns on and the display unit 14 displays some kind of information.

For example, when the print performing unit 16 completes printing, the printer 10 shifts from the processing state to the standby state. Further, when the control unit 20 completely supplies the image data to the display unit 14, the printer 10 shifts from the processing state to the standby state. At the standby state, the main CPU is being supplied with the clocks. Also, at the standby state, the light source of the display unit 14 turns on and the display unit displays some kind of information.

When the standby state continues for a predetermined time period, the printer 10 shifts from the standby state to the L sleep state. At the L sleep state, the main CPU is being supplied with the clocks. Also, at the L sleep state, the light source of the display unit 14 turns off and the display unit 14 does not display information.

When the L sleep state continues for a predetermined time period and a shift condition to the D sleep state is satisfied, the printer 10 shifts from the L sleep state to the D sleep state. Incidentally, the shift condition to the D sleep state includes a state where the connection between the printer 10 and the external device is not established. Therefore, for example, at a state where an XMPP connection (which will be described later) is established between the printer 10 and the notification server 90, the shift condition to the D sleep state is not satisfied, so that the printer 10 is unable to shift to the D sleep state. At the D sleep state, the main CPU is not supplied with the clocks. Also, at the D sleep state, the light source of the display unit 14 turns off and the display unit 14 does not display information. Accordingly, at the D sleep state, the power consumption of the printer 10 is lower than those of the processing state, the standby state and the L sleep state. Incidentally, in the below descriptions, the processing state, the standby state and the L sleep state may be collectively referred to as a 'high power consumption state.'

Figure 3A:
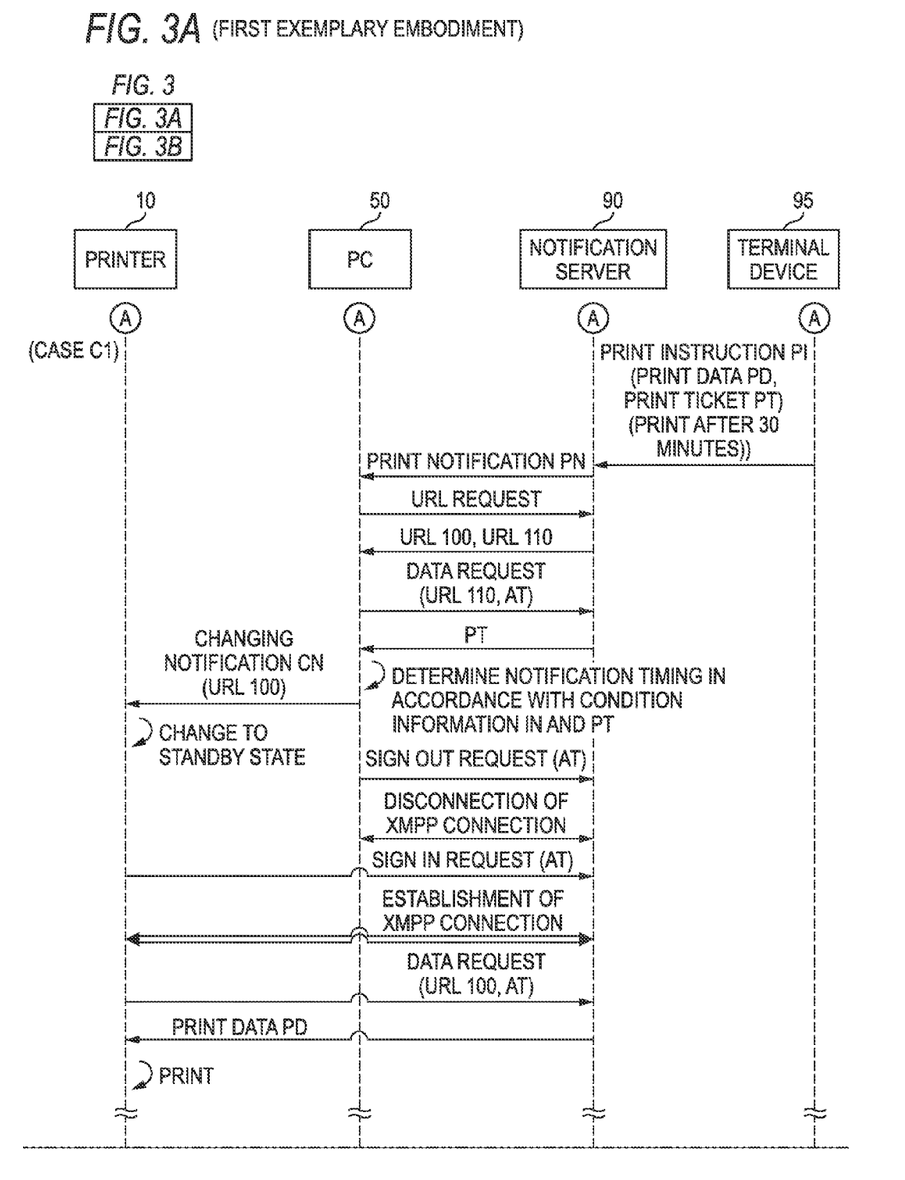
FIGS. 3A and 3B show sequence diagrams following FIG. 2 (a first exemplary embodiment)
Figure 3B:
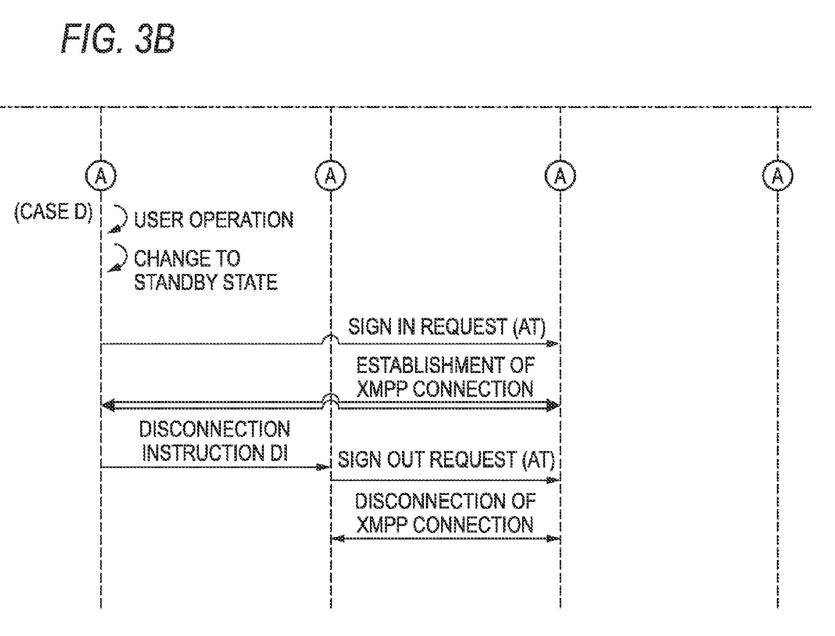

When a print instruction (for example, changing notification CN (refer to FIG. 3)) is provided from the external device or the operation unit 12 is operated while the printer 10 is at the D sleep state, the return condition of the main CPU is satisfied. In this case, the sub CPU starts to supply the clocks to the main CPU. Thereby, the main CPU performs the print processing, the image data supply processing and the like. That is, the printer 10 shifts from the D sleep state to the high power consumption state.

(Configuration of PC 50)

The PC 50 includes an operation unit 52, a display unit 54, a network interface 56 and a control unit 60. The respective units 52 to 60 are connected to a bus line (a reference numeral thereof is omitted). The operation unit 52 includes a keyboard and a mouse. A user can input various instructions to the PC 50 by operating the operation unit 52. The display unit 54 is a display for displaying a variety of information. The network interface 56 is connected to the LAN 4.

The control unit 60 includes a CPU 62 and a memory 64. The CPU 62 performs a variety of processing, in response to an OS program, applications (not shown) and the like stored in the memory 64. Incidentally, in this exemplary embodiment, the memory 64 stores therein specific applications that are provided by a vendor of the printer 10. As the CPU 62 performs the processing in response to the specific applications, functions of respective units 70 to 80 are implemented.

(Advance Preparations of User)

Subsequently, contents of advance preparations performed by a user will be described. Incidentally, the notification server 90 is provided by a company providing a cloud print service rather than a vendor of the printer 10 and the like. However, in modified exemplary embodiments, the notification server 90 may be a server that is provided by the vendor of the printer 10 and the like.

The user uses the terminal device 95 to beforehand register account information including a user ID, a password and the like with the notification server 90. Then, the user uses the terminal device 95 to access a web server embedded in the printer 10. In this case, the web server of the printer 10 supplies the terminal device 95 with screen data representing a log-in screen for inputting the account information. As a result, the log-in screen is displayed on the terminal device 95. The user inputs the account information in the log-in screen while seeing the log-in screen. In this case, the terminal device 95 supplies the account information to the printer 10.

When the account information is obtained from the terminal device 95, the control unit 20 of the printer 10 transmits the account information to the notification server 90. When the account information is received from the printer 10, the notification server 90 determines whether the account information is registered in the notification server 90 (that is, performs an authentication operation). As described above, since the account information has been already registered in the notification server 90, the notification server 90 determines that the authentication is successful. In this case, the notification server 90 generates an access token (in the below, simply referred to as 'AT') by using the account information. The AT is authentication information that is necessary to establish an XMPP connection with the notification server 90. Then, the notification server 90 supplies the AT to the printer 10.

When the AT is obtained from the notification server 90, a storage control unit 40 of the printer 10 stores the AT in the memory 24. Incidentally, the AT may be periodically updated. For example, the control unit 20 of the printer 10 may request the notification server 90 to generate a new AT when predetermined update timing arrives. In response to the request from the printer 10, the notification server 90 may generate a new AT and supply the same to the printer 10. In this case, the storage control unit 40 of the printer 10 stores the new AT in the memory 24 of the printer 10, instead of the old AT. Generally speaking, the authentication information (AT, in this exemplary embodiment) for establishing the XMPP connection with the notification server 90 may be information that is permanently used or is periodically updated.

When the AT is stored in the printer 10 and the notification server 90, the user of the terminal device 95 enables the printer 10 to perform printing through the internet 6 (e.g., the notification server 90) even without installing a printer driver for the printer 10 in the terminal device 95. That is, the user can use the cloud print service.

Figure 2:
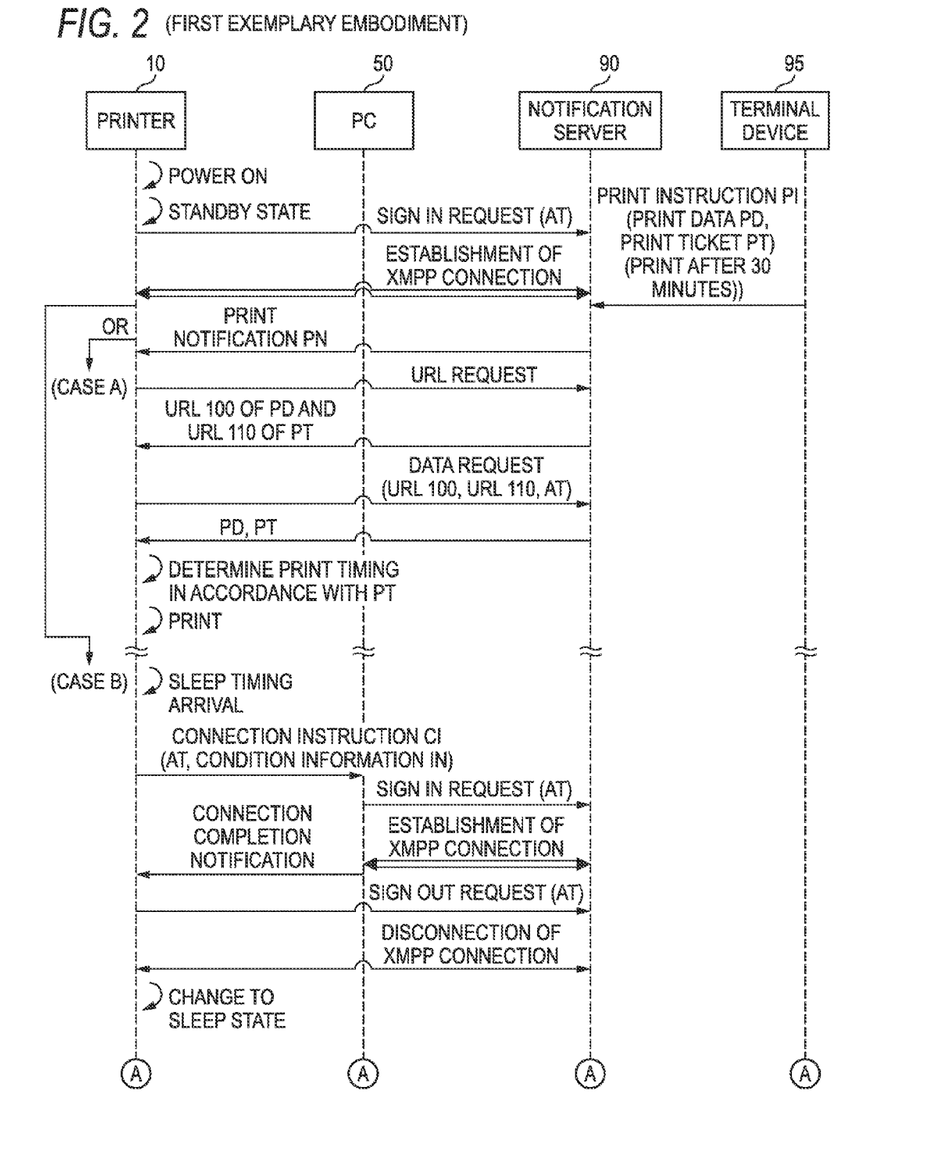
FIG. 2 shows a sequence diagram of processing that is performed by each device.

(Processing that is Performed by Each Device; FIG. 2)

In the below, the processing performed by the respective devices 10, 50, 90, 95 will be described with reference to FIGS. 2 and 3. When a power supply of the printer 10 is ON, the printer 10 shifts to the standby state.

When the printer 10 is at the standby state, an establishment unit 30 of the printer 10 transmits a log-in request including the AT in the memory 24 to the notification server 90. In this case, the notification server 90 performs the authentication operation by using the AT included in the log-in request. When the authentication is successful, an XMPP (eXtendible Messaging and Presence Protocol) connection (e.g., always-on connection) is established between the printer 10 and the notification server 90. In this manner, according to this exemplary embodiment, when the printer 10 is at the high power consumption state, the printer 10 transmits the log-in request including the AT to the notification server 90, thereby appropriately establishing the XMPP connection between the printer 10 and the notification server 90. Incidentally, at a state where the XMPP connection is established between the printer 10 and the notification server 90, a notification receiving unit 34 of the printer 10 can receive a print notification PN (which will be described later) from the notification server 90.

Incidentally, the establishment unit 30 may use the other protocol for connecting a client and a server, instead of the XMPP. That is, the establishment unit 30 has only to establish the connection (more specifically, always-on connection) between the printer 10 and the notification server 90. Incidentally, the always-on connection includes periodic connection such as polling.

(Case A of FIG. 2)

A case A of FIG. 2 shows that a print instruction PI is transmitted from the terminal device 95 to the notification server 90 before the printer 10 shifts to the D sleep state, e.g., while the printer 10 is at the high power consumption state (the processing state, the standby state or L sleep state).

When the user of the terminal device 95 wants to perform printing in accordance with print data PD (in the below, simply referred to as 'PD'), which is data of a print target, by using the cloud print service, the user first operates an operation unit (not shown) of the terminal device 95 to connect the terminal device 95 to the internet 6 and to access the notification server 90. Then, the user operates the operation unit of the terminal device 95 and selects the PD. Incidentally, the PD may be data stored in the terminal device 95 or data stored in a device (for example, data preservation server on the internet 6) different from the terminal device 95. In the below, a case is exemplified in which the PD is data stored in the terminal device 95. The user of the terminal device 95 operates the operation unit of the terminal device 96 and pre-designates a condition (hereinafter, referred to as 'terminal-side condition') representing timing at which the printer 10 should perform printing. In the below, regarding the terminal-side condition, a case where the printer 10 should perform printing after 30 minutes is exemplified. Incidentally, in the below, the information representing the terminal-side condition is referred to as print ticket PT (in the below, simply referred to as 'PT').

When the respective operations are performed in the terminal device 95, the terminal device 95 supplies a print instruction (in the below, simply referred to as 'PI') including the PD and PT to the notification server 90. Incidentally, the PI is an instruction for enabling the notification server 90 to transmit a print notification PN (which will be described later).

When the PI is received from the terminal device 95, the notification server 90 stores the PD and PT in a storage unit (not shown) of the notification server 90. Incidentally, in the notification server 90, the units for executing the variety of communications (reception of the PI, transmission of the print notification PN and the like) and the storage unit for storing the PD and PT may be integrally configured or separately configured. That is, the notification server 90 may be configured by only one device or a plurality of devices.

In the case A, at the time at which the PI is supplied to the notification server 90, the XMPP connection between the printer 10 and the notification server 90 is kept. In this case, the notification server 90 transmits a print notification PN (in the below, simply referred to as 'PN') to the printer 10. The print notification is a notification for notifying the printer 10 to perform printing.

A notification receiving unit 34 of the printer 10 receives the print notification from the notification server 90. In this case, a print control unit 38 of the printer 10 transmits a URL request to the notification server 90. The URL request is a request for instructing the notification server 90 to transmit a URL 100 representing a position in the storage unit of the notification server 90 at which the PD is stored and a URL 110 representing a position in the storage unit of the notification server 90 at which the PT is stored.

When the URL request is received from the printer 10, the notification server 90 transmits the URL 100 and URL 110 to the printer 10.

The print control unit 38 of the printer 10 receives the URL 100 and URL 110 from the notification server 90. In this case, the print control unit 38 transmits a data request including the URL 100, the URL 110 and the AT in the memory 24 to the notification server 90. The data request is a request for instructing the notification server 90 to transmit the PD and PT.

When the data request is received from the printer 10, the notification server 90 performs the authentication operation by using the AT included in the data request. When the authentication is successful, the notification server 90 supplies the PD and PT to the printer 10.

The print control unit 38 of the printer 10 obtains the PD and PT from the notification server 90. In this case, the print control unit 38 first determines print timing in accordance with the terminal-side condition indicated by the PT. As described above, in this exemplary embodiment, the PT indicates that the printer 10 should perform printing after 30 minutes. Therefore, the print control unit 38 determines the print timing after 30 minutes. When the determined print timing arrives (e.g., when 30 minutes elapse), the print control unit 38 uses the PD and generates data (for example, ON/OFF binary data of dots) for driving the print performing unit 16. Then, the print control unit 38 drives the print performing unit 16 in response to the data. That is, the print control unit 38 enables the print performing unit 16 to perform printing in accordance with the PD.

Incidentally, when the L sleep state continues for a predetermined time period and the shift condition to the D sleep state is satisfied until the determined print timing arrives, the printer 10 may be configured to shift to the D sleep state. In this case, when the determined print timing arrives, the printer 10 may shift from the D sleep state to the high power consumption state and perform printing in accordance with the PD. Further, the printer 10 may be configured not to shift to the D sleep state until the determined print timing arrives.

(Case B of FIG. 2)

A case B of FIG. 2 shows that the printer 10 shifts to the D sleep state. The user of the printer 10 may operate the operation unit 12 of the printer 10 and pre-designate a condition (hereinafter, referred to as 'printer-side condition) representing timing at which the PC 50 transmits a changing notification CN (refer to FIG. 3) (which will be described later). In the below, a case will be described in which the printer-side condition indicates reception timing of the print notification (e.g., when the print notification is received, the changing notification is immediately transmitted) as the transmission timing of the changing notification, and when there is the PT, the terminal-side condition indicated by the PT is given priority over the printer-side condition. Incidentally, in the below, the information representing the printer-side condition is referred to as condition information IN (in the below, simply referred to as 'IN').

When the L sleep state continues for a predetermined time period, an instruction transmitting unit 32 of the printer 10 transmits a connection instruction CI (in the below, simply referred to as 'CI'), which includes the AT in the memory 24 and the IN representing the printer-side condition designated by the user of the printer 10, to the PC 50.

An instruction receiving unit 70 of the PC 50 receives the CI from the printer 10. In this case, an establishment unit 72 of the PC 50 transmits the log-in request included in the CI to the notification server 90 to establish the XMPP connection between the PC 50 and the notification server 90. In this manner, according to this exemplary embodiment, the printer 10 can transmit the CI including the AT to the PC 50, thereby appropriately establishing the XMPP connection between the PC 50 and the notification server 90. Incidentally, at a state where the XMPP connection is established between the PC 50 and the notification server 90, a notification receiving unit 74 of the PC 50 can receive the print instruction from the notification server 90.

Then, a notification transmitting unit 76 of the PC 50 transmits a connection completion notification to the printer 10. The connection completion notification is a notification for notifying the printer 10 that the XMPP connection is established.

The notification receiving unit 34 of the printer 10 receives the connection completion notification from the PC 50. In this case, the establishment unit 30 of the printer 10 transmits a sign out request including the AT in the memory 24 to the notification server 90, thereby disconnecting the XMPP connection between the printer 10 and the notification server 90. Incidentally, at a state where the XMPP connection is not established between the printer 10 and the notification server 90, the notification receiving unit 34 of the printer 10 is unable to receive the print notification from the notification server 90.

When the XMPP connection is disconnected, the shift condition to the D sleep state (e.g., the connection between the printer 10 and the external device is not established) is satisfied. Therefore, a change unit 36 of the printer 10 shifts the state of the printer 10 from the high power consumption state (e.g., L sleep state) to the D sleep state. Specifically, the change unit 36 stops the clock supply to the main CPU. Incidentally, as described above, when the XMPP connection is established between the printer 10 and the notification server 90, the printer 10 of this exemplary embodiment is unable to shift to the D sleep state. In other words, the establishment unit 30 of the printer 10 is unable to establish the XMPP connection between the printer 10 and the notification server 90 when the printer 10 is at the D sleep state.

(Case C1 of FIG. 3)

A case C1 of FIG. 3 is a case continuing from the case B of FIG. 2 and shows that the print instruction PI is transmitted from the terminal device 95 to the notification server 90 while the printer 10 is at the D sleep state.

As similar to the case A of FIG. 2, the user of the terminal device 95 selects the PD and designates the terminal-side condition. As similar to the case A, the terminal-side condition indicates that the printer 10 should perform printing after 30 minutes. In this case, the terminal device 95 supplies the PI including the PD and PT to the notification server 90.

When the PI is received from the terminal device 95, the notification server 90 stores the PD and PT in a storage unit (not shown) of the notification server 90. In the case C1, the XMPP connection between the PC 50 and the notification server 90 is kept at the time that the PI is supplied to the notification server 90. In this case, the notification server 90 transmits the PN to the PC 50.

The notification receiving unit 74 of the PC 50 receives the print notification from the notification server 90. In this case, the notification receiving unit 74 transmits the URL request to the notification server 90 and receives the URL 100 and the URL 110 from the notification server 90. Then, the notification receiving unit 74 transmits the data request, which includes the URL 110 and the AT included in the CI (refer to FIG. 2) received from the printer 10, to the notification server 90 and receives the PT from the notification server 90.

Then, the notification transmitting unit 76 of the PC 50 determines transmission timing for transmitting a changing notification CN (in the below, simply referred to as 'CN') in accordance with the IN included in the CI (refer to FIG. 2) received from the printer 10 and the PT received from the notification server 90. As described above, in this exemplary embodiment, the printer-side condition indicated by the IN indicates the reception timing of the PN as the transmission timing of the CN, and when there is the PT, the terminal-side condition indicated by the PT is given priority over the printer-side condition. The terminal-side condition indicated by the PT indicates that the printer 10 should perform printing after 30 minutes. Therefore, the notification transmitting unit 76 determines after 30 minutes, as the transmission timing of the CN.

When the transmission timing of the CN arrives (e.g., 30 minutes elapse), the notification transmitting unit 76 of the PC 50 transmits the CN including the URL 100 to the printer 10. The CN is a notification for changing the state of the printer 10 from the D sleep state to the high power consumption state (for example, standby state). In this manner, in this exemplary embodiment, the PC 50 can transmit the CN to the printer at timing adapted to the printer-side condition designated in advance by the user of the printer 10 and the terminal-side condition pre-designated by the user of the terminal device 95.

The notification receiving unit 34 of the printer 10 receives the CN from the PC 50. In this case, the change unit 36 (more specifically, the sub CPU) of the printer 10 starts the clock supply to the main CPU. Thereby, the change unit 36 can change the state of the printer 10 from the D sleep state to the high power consumption state (for example, standby state).

Incidentally, when the CN is transmitted to the printer 10, the establishment unit 72 of the PC 50 transmits the sigh out request including the AT to the notification server 90, thereby disconnecting the XMPP connection between the PC 50 and the notification server 90. Thereby, it is possible to reduce the communication load between the PC 50 and the notification server 90.

When the state of the printer 10 is changed from the D sleep state to the high power consumption state, the establishment unit 30 of the printer 10 transmits the log-in request including the AT in the memory 24 to the notification server 90, thereby establishing the XMPP connection between the printer 10 and the notification server 90. Then, the print control unit 38 of the printer 10 transmits the data request including the URL 100 included in the CN and the AT in the memory 24 to the notification server 90, thereby obtaining the PD from the notification server 90. In this case, the print control unit 38 enables the print performing unit 16 to perform printing in accordance with the PD. As described above, when the CN is received from the PC 50, the printer 10 establishes the XMPP connection between the printer 10 and the notification server 90. Therefore, the printer 10 can appropriately obtain the PD from the notification server 90, so that the printer can appropriately perform printing in accordance with the PD.

(Case D of FIG. 3)

A case D of FIG. 3 is a case continuing from the case B of FIG. 2 and shows that the user operates the operation unit 12 of the printer 10 while the printer 10 is at the D sleep state.

When any one key included in the operation unit 12 of the printer 10 is operated by the user, the change unit 36 of the printer 10 starts the clock supply to the main CPU and changes the state of the printer 10 from the D sleep state to the high power consumption state (for example, standby state) even though the CN is not received from the PC 50. In this case, the information relating to the operation made through the operation unit 12 is displayed on the display unit 14 of the printer 10. Incidentally, in addition to the case where the operation unit 12 of the printer 10 is operated by the user, when a print instruction is received from a PC in which a printer driver for the printer 10 is installed, for example, the change unit 36 of the printer 10 can change the state of the printer 10 from the D sleep state to the high power consumption state even though the CN is not received from the PC 50.

Then, the establishment unit 30 of the printer 10 transmits the log-in request including the AT in the memory 24 to the notification server 90, thereby establishing the XMPP connection between the printer 10 and the notification server 90. Then, the instruction transmitting unit 32 of the printer 10 transmits a disconnection instruction DI (in the below, simply referred to as 'DI') to the notification server 90. The DI is an instruction for disconnecting the XMPP connection between the PC 50 and the notification server 90.

The instruction receiving unit 70 of the PC 50 receives the DI from the printer 10. In this case, the establishment unit 72 of the PC 50 transmits the sign out request including the AT to the notification server 90, thereby disconnecting the XMPP connection between the PC 50 and the notification server 90. Incidentally, in this case, when there is a reserved print notification in the PC 50 (for example, when the changing notification is scheduled to be transmitted after 30 minutes), the notification transmitting unit 76 of the PC 50 transmits the reserved print notification to the printer 10. Thereby, as similar to the case A of FIG. 2, the printer 10 can perform printing in response to the print notification.

In this manner, in this exemplary embodiment, when the printer 10 is at the D sleep state, the printer 10 transmits the DI to the PC 50 in accordance with the operation performed by the user of the printer 10. Therefore, when it is necessary to change the state of the printer 10 from the D sleep state to the high power consumption state, e.g., when it is necessary to establish the XMPP connection between the printer 10 and the notification server 90, it is possible to disconnect the XMPP connection between the PC 50 and the notification server 90. As a result, it is possible to reduce the communication load between the PC 50 and the notification server 90.

Advantages of First Exemplary Embodiment

In this exemplary embodiment, as shown in FIG. 2, when the printer 10 is at the high power consumption state, the printer 10 establishes the XMPP connection between the printer 10 and the notification server 90. Therefore, as shown in the case A of FIG. 2, when the PI is supplied from the terminal device 95 to the notification server 90 while the printer 10 is at the high power consumption state, the printer 10 can appropriately receive the PN from the notification server 90. As a result, the printer 10 can appropriately perform printing.

Also, when the printer 10 is at the D sleep state, the printer 10 is unable to establish the XMPP connection between the printer 10 and the notification server 90. Therefore, as shown in the case B of FIG. 2, when the state of the printer 10 should be changed from the high power consumption state to the D sleep state, the printer 10 transmits the CI to the PC 50 and establishes the XMPP connection between the PC 50 and the notification server 90. Thereby, the printer 10 can be changed from the high power consumption state to the D sleep state, so that it is possible to appropriately reduce the power consumption of the printer 10. Further, as shown in the case C1 of FIG. 3, when the PI is supplied from the terminal device 95 to the notification server 90 while the printer 10 is at the D sleep state, the printer 10 can receive the CN from the PC 50 and can be changed from the D sleep state to the high power consumption state. As a result, the printer 10 can appropriately perform printing. According to the above configuration, it is possible to enable the printer 10, which performs printing by using the notification server 90, to appropriately perform printing while appropriately reducing the power consumption. That is, the printer 10 can appropriately perform printing by using the cloud print service.

As shown in the case B of FIG. 2, when the state of the printer 10 should be changed from the high power consumption state to the D sleep state, the PC 50 receives the CI from the printer 10 and establishes the connection between the PC 50 and the notification server 90. Accordingly, as shown in the case C1 of FIG. 3, while the printer 10 is at the D sleep state, the PC 50 can receive the PN from the notification server 90, acting in place of the printer 10. Further, in this case, the PC 50 transmits the CN to the printer 10 and changes the state of the printer 10 from the D sleep state to the high power consumption state. Accordingly, it is possible to enable the printer 10 to appropriately perform printing.

The PC 50 is one example of the 'proxy server.' The high power consumption state and the D sleep state are examples of the 'first state' and the 'second state', respectively. The case A of FIG. 2 and the case C1 of FIG. 3 are examples of the 'first situation' and the 'second situation', respectively. The access token AT is one example of the 'authentication information.' The printer-side condition and the terminal-side condition are examples of the 'first condition' and the 'second condition', respectively. Therefore, the condition information IN and the print ticket PT are examples of the 'first condition information' and the 'second condition information', respectively. The disconnection instruction DI is one example of the 'predetermined instruction.'

Second Exemplary Embodiment

Figure 4:
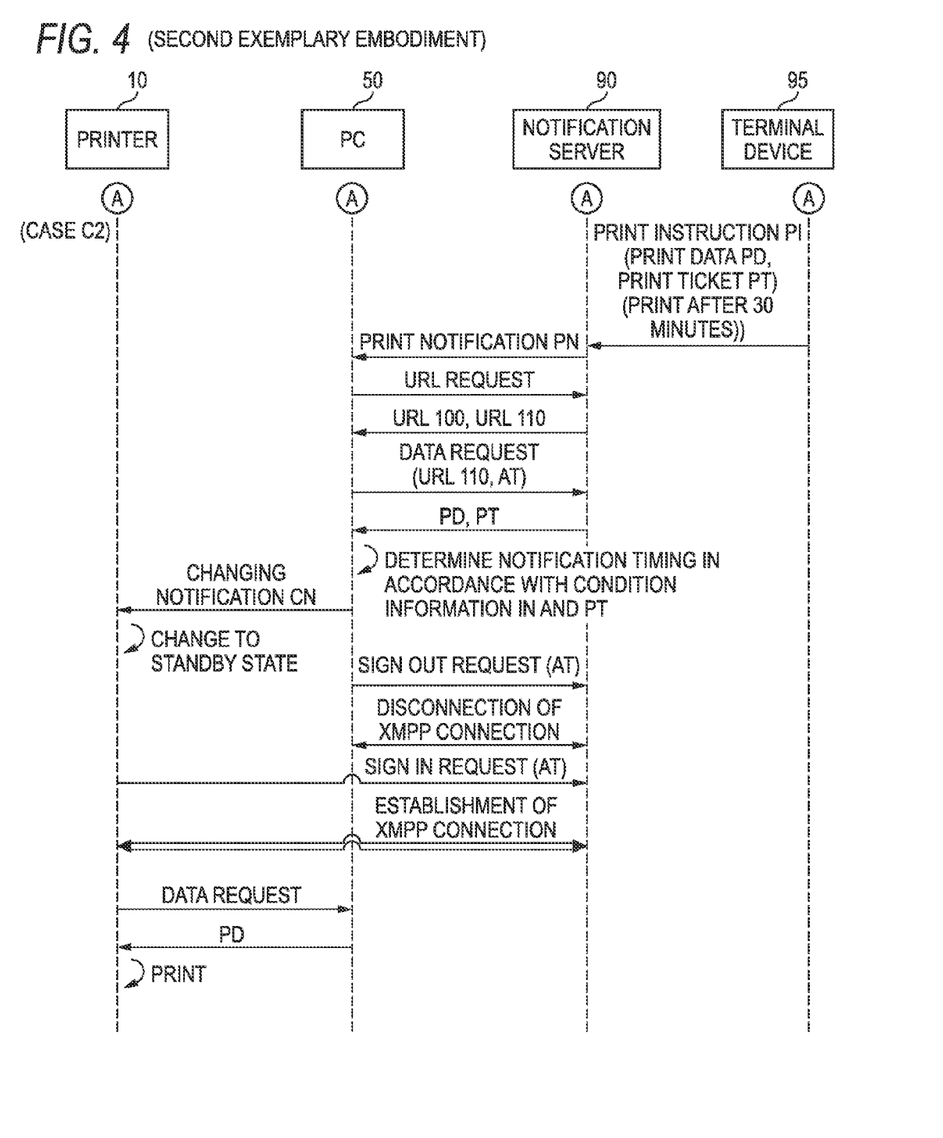
FIG. 4 shows a sequence diagram following FIG. 2 (a second exemplary embodiment).

In this exemplary embodiment, a case C2 of FIG. 4 is implemented instead of the case C1 of FIG. 3. The respective processing, which is performed until the URL 100 and the URL 110 are transmitted from the notification server 90 to the PC 50, is the same as the case C1 of FIG. 3.

An obtaining unit 78 of the PC 50 transmits the data request including the URL 100, the URL 110 and the AT to the notification server 90 to obtain the PD and PT from the notification server 90. Here, the obtaining of the PD is different from the case C1 of FIG. 3. Subsequently, the respective processing, which is performed until the XMPP connection is established between the printer 10 and the notification server 90, is the same as the case C1 of FIG. 3.

When the XMPP connection is established between the printer 10 and the notification server 90, the print control unit 38 of the printer 10 transmits the data request to the PC 50. In this case, a supply unit 80 of the PC 50 supplies the printer 10 with the PD obtained from the notification server 90. The print control unit 38 of the printer 10 obtains the PD from the PC 50 and performs printing in accordance with the PD.

Advantages of Second Exemplary Embodiment

For example, when the method with which the printer 10 obtains the PD from the notification server 90 is adopted, a following situation may occur. That is, a time period (for example, 1 hour) for which the PD is stored may be designated in the notification server 90. In this case, when the timing at which the CN is transmitted from the PC 50 to the printer 10 is late (for example, when the PT indicates the print after 2 hours), the PD may be erased from the notification server 90, so that a situation may occur in which the printer 10 is unable to obtain the PD from the notification server 90. Compared to this, in this second exemplary embodiment, when receiving the PN from the notification server 90, the PC 50 obtains the PD from the notification server 90. Then, when receiving the CN from the PC 50, the printer 10 obtains the PD from the PC 50, not from the notification server 90. Therefore, it is possible to appropriately suppress the above situation from occurring, which is caused because the CN is not transmitted from the PC 50 to the printer 10 after the PD is erased from the notification server 90.

Further, in this exemplary embodiment, the printer 10 does not have to perform the communication with the notification server 90 through the internet 6 so as to obtain the PD, and the printer 10 has only to perform the communication with the PC 50 through the LAN 4. Therefore, it is possible to reduce the communication load (processing load) of the printer 10.

Modifications to Exemplary Embodiments

Although the specific exemplary embodiments of the invention have been specifically described, they are just exemplary and do not limit the claims. The technology defined in the claims includes a variety of modifications and changes to the above-described exemplary embodiments. The modified exemplary embodiments of the above-described exemplary embodiments are enumerated as follows.

Modified Exemplary Embodiment 1

The 'printer' may not be a device having only the print function and may be a device having the other functions (scan, copy, FAX, telephone functions and the like). That is, the term 'printer' includes a copier, a FAX machine, a multifunction device (device having at least a print function and other functions) and the like.

Modified Exemplary Embodiment 2

In the above-described exemplary embodiments, the printer 10 can be switched among the processing state, the standby state, the L sleep state and the D sleep state. Alternatively, the printer 10 may be switched among the processing state, the standby state and the sleep state (e.g., D sleep state) without the L sleep state. During the sleep state, the establishment unit 30 of the printer 10 may not establish the XMPP connection between the printer 10 and the notification server 90. Generally speaking, the 'second state' is preferably a state in which the printer less consumes the power than in the first state and the connection between the printer and the notification server is unable to be established.

Modified Exemplary Embodiment 3

The 'proxy server' is not limited to the PC and may be an access point, a router, a printer, a general server and the like. Specifically, the 'proxy server' is preferably a device in which a power supply thereof is basically ON. This is because it is necessary to establish the connection between the proxy server and the notification server when receiving a connection instruction from the printer.

Modified Exemplary Embodiment 4

In the above-described exemplary embodiments, the printer-side condition indicates the reception timing of the PN, as the transmission timing of the CN (that is, the printer-side condition indicates that the changing notification is immediately transmitted when the print notification is received). Alternatively, the printer-side condition may indicate that the PC 50 transmits the CN to the printer 10 only for a predetermined time zone (for example, the daytime) or may indicate the reception timing of the predetermined number of PNs, as the transmission timing of the CN. Further, in the above-described exemplary embodiments, the printer-side condition indicates that the terminal-side condition is given priority over the printer-side condition when there exist the terminal-side condition (e.g., print ticket PT). Alternatively, the printer-side condition may indicate that the printer-side condition is given priority over the terminal-side condition when there exist the terminal-side condition. Generally speaking, the 'first condition' may be a condition for determining the timing at which the proxy server transmits the changing notification to the printer.

Modified Exemplary Embodiment 5

In the above-described exemplary embodiments, the terminal-side condition indicates that printing is performed after 30 minutes. Alternatively, the terminal-side condition may indicate that printing is immediately performed. Further, the terminal-side condition may indicate that the printer-side condition is given priority over the terminal-side condition when there is the printer-side condition (e.g., condition information IN). Generally speaking, the 'second condition' may be a condition for determining the timing at which the proxy server transmits the changing notification to the printer.

Modified Exemplary Embodiment 6

In the above-described exemplary embodiments, the PT is necessarily transmitted from the terminal device 95 to the notification server 90. Alternatively, when the user of the terminal device 95 does not designate the terminal-side condition, for example, the PT may not be transmitted from the terminal device 95 to the notification server 90. In this case, in the cases C1 and C2 of FIGS. 3 and 4, the notification receiving unit 74 of the PC 50 may not receive the PT from the notification server 90. The notification transmitting unit 76 of the PC 50 may determine the timing for transmitting the CN to the printer 10 in accordance with only the IN. Generally speaking, the 'notification transmitting unit' may determine the timing at which the proxy server transmits the changing notification to the printer in accordance with the first condition.

Modified Exemplary Embodiment 7

When receiving the PN from the notification server 90, the notification receiving unit 74 of the PC 50 may perform determination processing of determining whether the printer-side condition indicated by the IN is satisfied, thereby determining whether or not to obtain the PT from the notification server 90 in accordance with a result of the determination processing. For example, a situation is assumed in which the printer-side condition indicates that the PC 50 transmits the CN to the printer 10 only for a predetermined time zone (for example, the daytime) and the terminal-side condition indicates that printing is performed after 30 minutes. (Case 1) When the PN is received from the notification server 90 during the daytime, the notification receiving unit 74 of the PC 50 makes positive determination the determination processing and may not obtain the PT from the notification server 90. When the PT is received from the notification server 90, the notification transmitting unit 76 of the PC 50 may immediately transmit the CN to the printer 10. (Case 2) When the PN is received from the notification server 90 during the nighttime, the notification receiving unit 74 of the PC 50 makes negative determination in the determination processing and may obtain the PT from the notification server 90. The notification transmitting unit 76 of the PC 50 may transmit the CN to the printer 10 after 30 minutes in accordance with the terminal-side condition indicated by the PT. In this manner, regarding the method of determining the transmission timing of the CN in accordance with the printer-side condition and the terminal-side condition, a variety of methods are considered. Generally speaking, the 'notification transmitting unit' may determine the timing at which the proxy server transmits the changing notification to the printer in accordance with the first condition and the second condition.

Modified Exemplary Embodiment 8

In the above-described exemplary embodiments, as shown in the case B of FIG. 2, the instruction transmitting unit 32 of the printer 10 transmits the CI including the AT to the PC 50. Alternatively, when the AT is beforehand stored in the memory 64 of the PC 50 (for example, when the user stores the AT in the PC 50 in advance), the instruction transmitting unit 32 of the printer 10 may transmit the CI, which does not include the AT, to the PC 50. In this case, the establishment unit 72 of the PC 50 may transmit the log-in request including the AT in the memory 64 of the PC 50 to the notification server 90 to establish the XMPP connection between the PC 50 and the notification server 90. Generally speaking, the 'instruction transmitting unit' may transmit a connection instruction for establishing the connection between the proxy server and the notification server to the proxy server.

Modified Exemplary Embodiment 9

In the above-described exemplary embodiments, when the user performs the advance preparations and the printer 10 transmits the account information to the notification server 90, the notification server 90 generates the AT and the storage control unit 40 of the printer 10 stores the AT in the memory 24. Alternatively, when the printer 10 transmits the account information to the notification server 90, the notification server 90 does not generate the AT, and the printer 10 may store the account information in the memory 24. The storage control unit 40 of the printer 10 may transmit the account information to the notification server 90 and request the notification server 90 to generate the AT whenever a situation requiring the AT (for example, a situation where the log-in request should be transmitted to the notification server 90) occurs. In this case, the storage control unit 40 temporarily stores the AT, which is obtained from the notification server 90, in the memory 23, and the control unit 20 uses the AT in the memory 24. After that, the AT is erased from the memory 24. Generally speaking, the authentication information may be the information that is permanently or temporarily stored in the memory of the printer. Incidentally, the authentication information is not limited to the access token and may be the other information (for example, the account information, the other type tokens and the like) for establishing the connection with the notification server.

Modified Exemplary Embodiment 10

In the case D of FIG. 3, the instruction transmitting unit 32 of the printer 10 transmits the disconnection instruction DI to the PC 50. Alternatively, when there is a reserved print notification in the PC 50 (for example, when the changing notification is scheduled to be transmitted to the printer 10 after 30 minutes), the instruction transmitting unit 32 may transmit to the PC 50 a transmission instruction for instructing the PC 50 to transmit the reserved print notification to the printer 10. In this case, the establishment unit 72 of the PC 50 may transmit the reserved print notification to the printer 10 without disconnecting the XMPP connection between the PC 50 and the notification server 90. Incidentally, in this case, the establishment unit 72 may hold the XMPP connection between the PC 50 and the notification server 90 until the power supply of the PC 50 turns OFF, and may disconnect the above connection after transmitting the reserved print notification to the printer 10. Generally speaking, the 'predetermined instruction' may be an instruction that is transmitted from the printer to the proxy server when the printer is at the second state and a predetermined operation is made for the operation unit of the printer.

Modified Exemplary Embodiment 11

In the above-described exemplary embodiments, the CPU 22 of the printer 10 performs software, so that the functions of the respective units 30 to 40 are implemented. Also, the CPU 62 of the PC 50 performs software, so that the functions of the respective units 70 to 80 are implemented. However, at least parts of the respective units 30 to 40 and 70 to 80 may be implemented by hardware such as logic circuit.

The technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A printer configured to be switched between a first state and a second state where less power is consumed than in the first state, the printer comprising:
   a processor; and
   a memory having computer-readable instructions stored thereon that, when executed by the processor, cause the printer to operate as:
      a printer-side establishment unit configured to establish an internet connection between the printer and a notification server when the printer is at the first state, wherein the printer-side establishment unit is unable to establish the internet connection between the printer and the notification server when the printer is at the second state;
      an instruction transmitting unit configured to transmit a connection instruction for establishing an internet connection between a proxy server and the notification server to the proxy server when a state of the printer is to be changed from the first state to the second state, the printer connected to the proxy server by a local area network connection;
      a storage control unit configured to store authentication information for establishing the internet connection with the notification server in a storage unit of the printer, the authentication information associated with a user and authenticating that the printer is configured to perform printing for the user, wherein the user has account information registered with the notification server such that the authentication information controls the printer to perform printing for the user who has registered account information with the notification server;
      wherein the printer-side establishment unit is configured to transmit the stored authentication information in the storage unit to the notification server and establish the internet connection between the printer and the notification server based on the authentication information, when the printer is at the first state, and wherein the instruction transmitting unit is configured to, when the printer is at the second state, transmit the connection instruction including the authentication information in the storage unit to the proxy server for establishing the internet connection between the proxy server and the notification server by utilizing the authentication information;

a printer-side notification receiving unit configured to receive:
- a print notification from the notification server in a first situation where the printer is at the first state and the internet connection between the printer and the notification server is kept, wherein the print notification is transmitted from the notification server to the printer based on the authentication information transmitted to the notification server and when a print instruction is supplied from a terminal device to the notification server during the first situation; and
- a changing notification from the proxy server in a second situation where the printer is at the second state and the network connection between the proxy server and the notification server is kept, wherein the changing notification is transmitted from the proxy server to the printer via the local area network connection, when the print instruction is supplied from the terminal device to the notification server during the second situation and the print notification is transmitted from the notification server to the proxy server;

a change unit configured to change the state of the printer from the first state to the second state when the connection instruction is transmitted to the proxy server via the local area network connection, and configured to change the state of the printer from the second state to the first state when the changing notification is received from the proxy server; and a print control unit configured to control a print performing unit to perform printing in accordance with print data when the print notification is received from the notification server, and configured to control the print performing unit to perform printing in accordance with print data when the changing notification is received from the proxy server.

2. The printer according to claim 1,
wherein the instruction transmitting unit is configured to transmit to the proxy server the connection instruction including first condition information representing a first condition pre-designated by a user, and
wherein the first condition is for determining timing at which the proxy server transmits the changing notification to the printer.

3. The printer according to claim 1,
wherein when the printer is at the second state and an operation unit of the printer receives a user instruction,
the change unit is configured to change the state of the printer from the second state to the first state even when the changing notification is not received from the proxy server,
the printer-side establishment unit is configured to establish the internet connection between the printer and the notification server after the state of the printer is changed from the second state to the first state, and the instruction transmitting unit is configured to transmit a predetermined instruction to the proxy server after the state of the printer is changed from the second state to the first state.

4. The printer according to claim 1,
wherein when the changing notification is received from the proxy server,
the printer-side establishment unit is configured to establish the internet connection between the printer and the notification server after the state of the printer is changed from the second state to the first state, and
the print control unit is configured to obtain the print data from the notification server after the internet connection between the printer and the notification server is established, and then configured to control the print performing unit to perform printing in accordance with the print data.

5. A system comprising:
the printer as recited in claim 1; and
a proxy server, wherein the proxy server comprises:
a processor, and
a memory having computer-readable instructions stored thereon that, when executed by the processor, cause the proxy server to operate as:
an instruction receiving unit configured to receive a connection instruction including an authentication information for establishing an internet connection between the proxy server and a notification server from the printer when a state of the printer is to be changed from a first state to a second state where power is less consumed than in the first state;
a server-side establishment unit configured to establish the internet connection between the proxy server and the notification server by utilizing the authentication information, when the connection instruction is received from the printer;
a server-side notification receiving unit configured to receive a print notification from the notification server in a second situation where the printer is at the second state and the internet connection between the proxy server and the notification server is kept, wherein the print notification is transmitted from the notification server to the proxy server based on the authentication information transmitted to the notification server and when a print instruction is supplied from a terminal device to the notification server during the second situation; and
a notification transmitting unit configured to transmit to the printer a changing notification for changing the state of the printer from the second state to the first state when the print notification is received from the notification server.

6. The system according to claim 5,
wherein the instruction receiving unit is configured to receive from the printer the connection instruction including first condition information representing a first condition pre-designated by a user of the printer, and
wherein the notification transmitting unit is configured to determine timing at which the proxy server transmits the changing notification to the printer in accordance with the first condition when the print notification is received from the notification server, and configured to transmit the changing notification to the printer at the determined timing.

7. The system according to claim 6,
wherein the server-side notification receiving unit is configured to further receive, from the notification server, second condition information representing a second condition pre-designated by a user of the terminal device, and
wherein the notification transmitting unit is configured to determine the timing in accordance with the first condition and the second condition when the print notification is received from the notification server.

8. The system according to claim 5,
wherein the computer-readable instructions that, when executed by the processor, cause the proxy server to operate as:
an obtaining unit configured to obtain print data from the notification server when the print notification is received from the notification server; and
a supply unit configured to supply the print data to the printer.

9. The printer according to claim 1, wherein the print control unit is configured to:
in response to the printer-side notification receiving unit receiving the print notification from the notification server in the first situation, transmit a location information request to the notification server and receive the location information from the notification server;
transmit a data request including the location information to the notification server and receive the print data from the notification server; and
control a print performing unit to perform printing in accordance with the print data.

10. The printer according to claim 1,
wherein in the second situation, the printer-side notification receiving unit is configured to receive the changing notification including the location information, and
wherein when the changing notification is received from the proxy server, the print control unit is configured to:
transmit a data request including the location information to the notification server and receive the print data from the notification server; and
control the print performing unit to perform printing in accordance with the print data.

11. The printer according to claim 1,
wherein in the second situation, the printer-side notification receiving unit is configured to receive the changing notification when the print instruction including the print data is supplied from the communication terminal device to the notification server via the network during the second situation and the print notification, the location information and the print data are transmitted from the notification server to the proxy server, and
wherein when the changing notification is received from the proxy server, the print control unit is configured to:
transmit a data request to the proxy server and receive the print data from the proxy server; and
control the print performing unit to perform printing in accordance with the print data.

12. A non-transitory computer-readable storage medium having a computer program for a proxy server stored thereon and readable by a computer mounted to the proxy server, the computer program, when executed by the computer, causes the computer to perform operations comprising:
an instruction receiving process of receiving from a printer, via a local area network connection, a connection instruction including authentication information for establishing an internet connection between the proxy server and a notification server when a state of the printer is to be changed from a first state to a second state where power is less consumed than in the first state, the authentication information associated with a user and authenticating that the printer is configured to perform printing for the user, wherein the user has account information registered with the notification server such that the authentication information controls the printer to perform printing for the user who has registered account information with the notification server;
a server-side establishment process of establishing the internet connection between the proxy server and the notification server by utilizing the authentication information, when the connection instruction is received from the printer;
a server-side notification receiving process of receiving a print notification from the notification server in a second situation where the printer is at the second state and the internet connection between the proxy server and the notification server is kept, wherein the print notification is transmitted from the notification server to the proxy server based on the authentication information transmitted to the notification server and when a print instruction is supplied from a terminal device to the notification server during the second situation; and
a notification transmission process of transmitting to the printer a changing notification via the local area network connection for changing the state of the printer from the second state to the first state when the print notification is received from the notification server.

* * * * *